(12) United States Patent
Lusk et al.

(10) Patent No.: US 7,581,956 B2
(45) Date of Patent: Sep. 1, 2009

(54) LEARNING AID AND METHOD OF TEACHING

(76) Inventors: Paula P. Lusk, 516 Betsy Ross La., Asheville, NC (US) 28805; Victoria L. Solesbee, P.O. Box 1303, Black Mountain, NC (US) 28711

( * ) Notice: Subject to any disclaimer, the term of this patent is extended or adjusted under 35 U.S.C. 154(b) by 582 days.

(21) Appl. No.: 11/161,907

(22) Filed: Aug. 22, 2005

(65) Prior Publication Data

US 2007/0042331 A1     Feb. 22, 2007

(51) Int. Cl.
    *G09B 19/00*     (2006.01)
(52) U.S. Cl. .................................................. 434/167
(58) Field of Classification Search ................. 434/156, 434/159, 160, 167, 172, 176, 178, 188, 191; 273/299, 302
    See application file for complete search history.

(56) References Cited

U.S. PATENT DOCUMENTS

| | | | | |
|---|---|---|---|---|
| 1,230,263 | A * | 6/1917 | Alexander | 434/159 |
| 1,256,100 | A * | 2/1918 | Bamberg | 273/157 R |
| 1,477,322 | A * | 12/1923 | Degheri | 434/406 |
| 2,756,515 | A * | 7/1956 | Hoffman | 434/159 |
| D197,432 | S * | 2/1964 | Maxwell | D21/381 |
| 3,365,198 | A * | 1/1968 | Hay | 273/157 R |
| 3,618,956 | A * | 11/1971 | Biederer | 273/157 R |
| 4,173,832 | A | 11/1979 | Chen et al. | |
| 4,398,891 | A | 8/1983 | King | |
| 4,661,074 | A | 4/1987 | Walker | |
| 4,778,392 | A * | 10/1988 | Mitchell | 434/403 |
| 5,306,006 | A * | 4/1994 | Bell | 273/157 R |
| 5,417,432 | A * | 5/1995 | Dwyer | 273/299 |
| 5,690,493 | A | 11/1997 | McAlear, Jr. | |
| 5,788,503 | A * | 8/1998 | Shapiro et al. | 434/172 |
| 5,800,176 | A | 9/1998 | Harrison | |
| 5,842,868 | A | 12/1998 | Phillips | |
| 6,045,363 | A | 4/2000 | Phillips | |
| 6,148,286 | A * | 11/2000 | Siegel | 704/270 |
| 6,343,935 | B1 | 2/2002 | Clements | |
| 6,390,820 | B1 | 5/2002 | Landman | |
| 6,449,460 | B2 | 9/2002 | Logan | |
| 7,011,525 | B2 * | 3/2006 | Mejia | 434/167 |

* cited by examiner

*Primary Examiner*—Kurt Fernstrom
(74) *Attorney, Agent, or Firm*—WRB - IP LLP

(57) ABSTRACT

A learning aid includes a tangible medium of expression, an image fixed on the medium, the image being at least partially formed of letters making up a spelling word, and at least one sentence illustrated by the image and associated with the medium, the sentence including at least one use of the spelling word. A teaching method includes reading a sentence containing a use of a spelling word to a student, showing the student an image that is at least partially formed of letters making up the spelling word, the image illustrating the sentence, and having the student spell the spelling word while viewing the image.

5 Claims, 5 Drawing Sheets

LEARNING AID AND METHOD OF TEACHING

BACKGROUND AND SUMMARY

The present invention relates to learning aids and, more particularly, to learning aids for teaching and learning spelling and reading.

It is often difficult for beginning and low-level readers to understand how series of letters can be associated to form a word. For such readers, visual images may be more easily understood and retained than series of letters. Visual images presented in a sequence to illustrate a sentence or a story can also be understood and retained better than series of letters.

According to an aspect of the present invention, a learning aid includes a tangible medium of expression, an image fixed on the medium, the image being at least partially formed of letters making up a spelling word, and at least one sentence illustrated by the image and associated with the medium, the sentence including at least one use of the spelling word.

According to another aspect of the present invention, a teaching method includes reading a sentence containing a use of a spelling word to a student, showing the student an image that is at least partially formed of letters making up the spelling word, the image illustrating the sentence, and having the student spell the spelling word while viewing the image.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
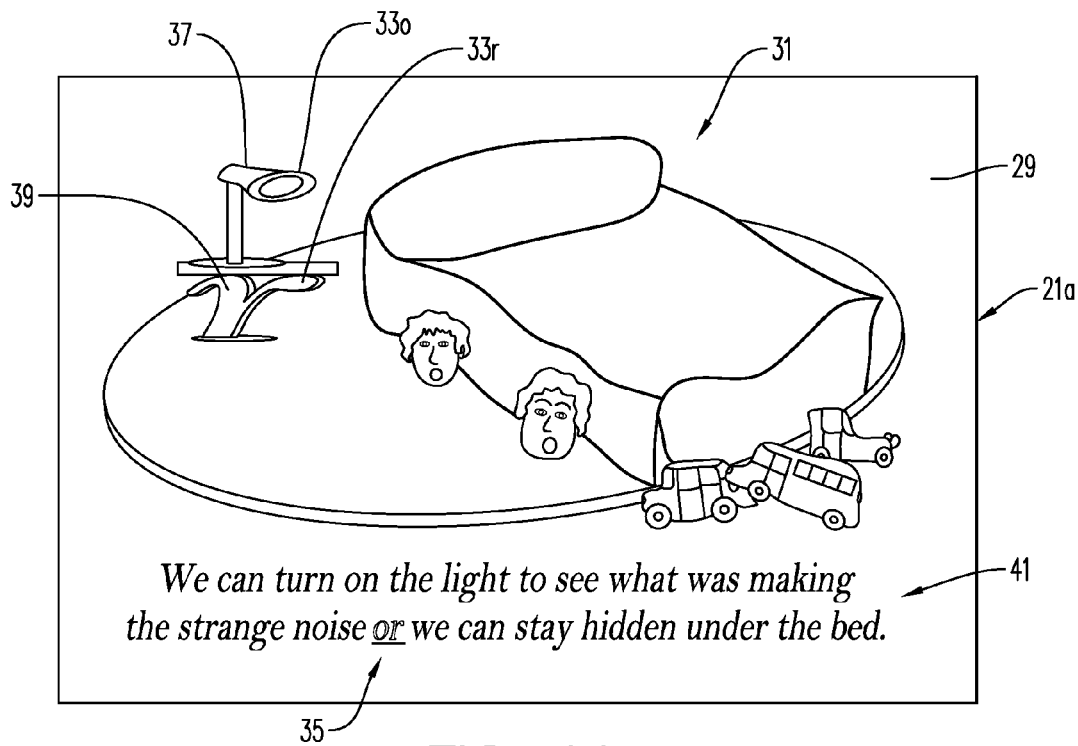
FIGS. 1A-1B, 2A-2B, 3A-3B, and 4A-4B show front and rear sides of learning aids according to embodiments of the present invention.
Figure 1B:
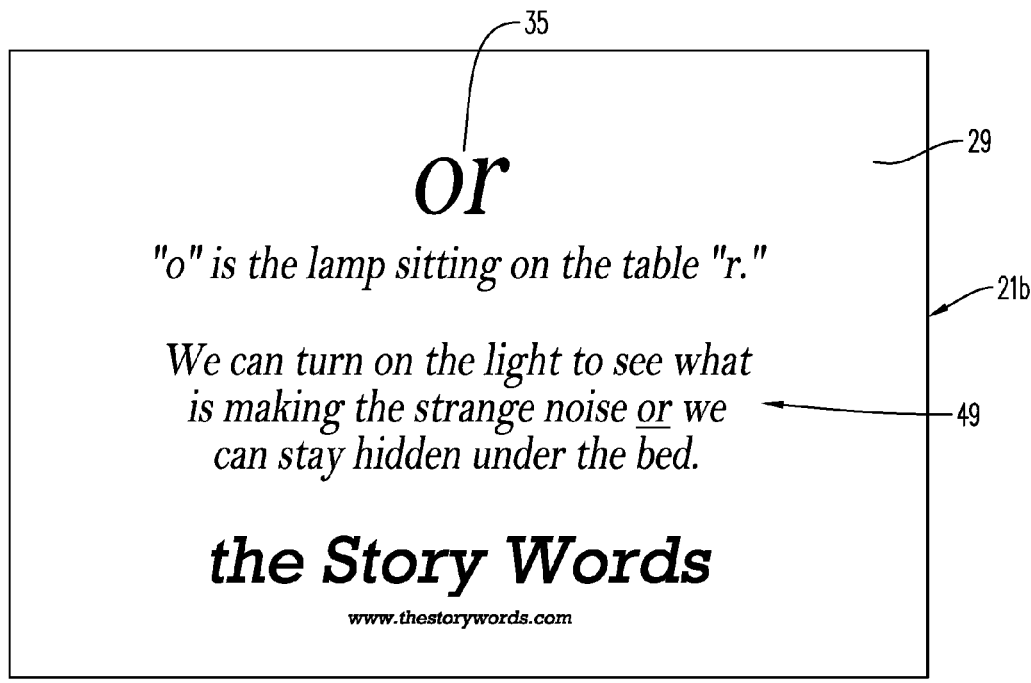
Figure 2A:
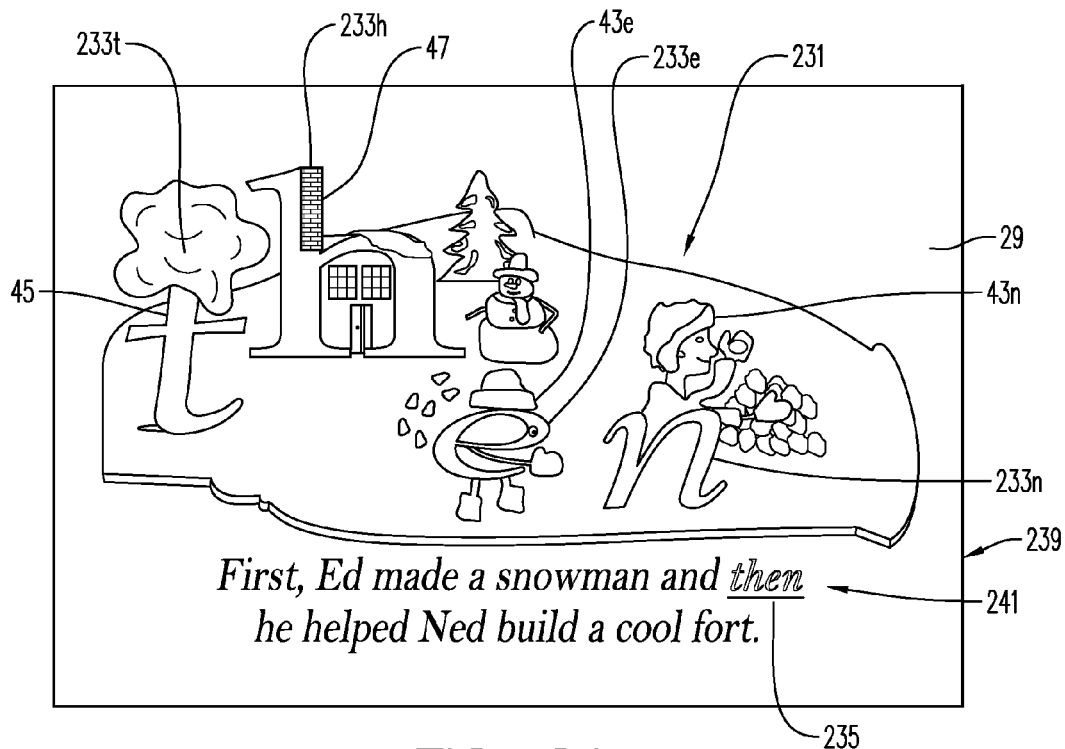
Figure 2B:
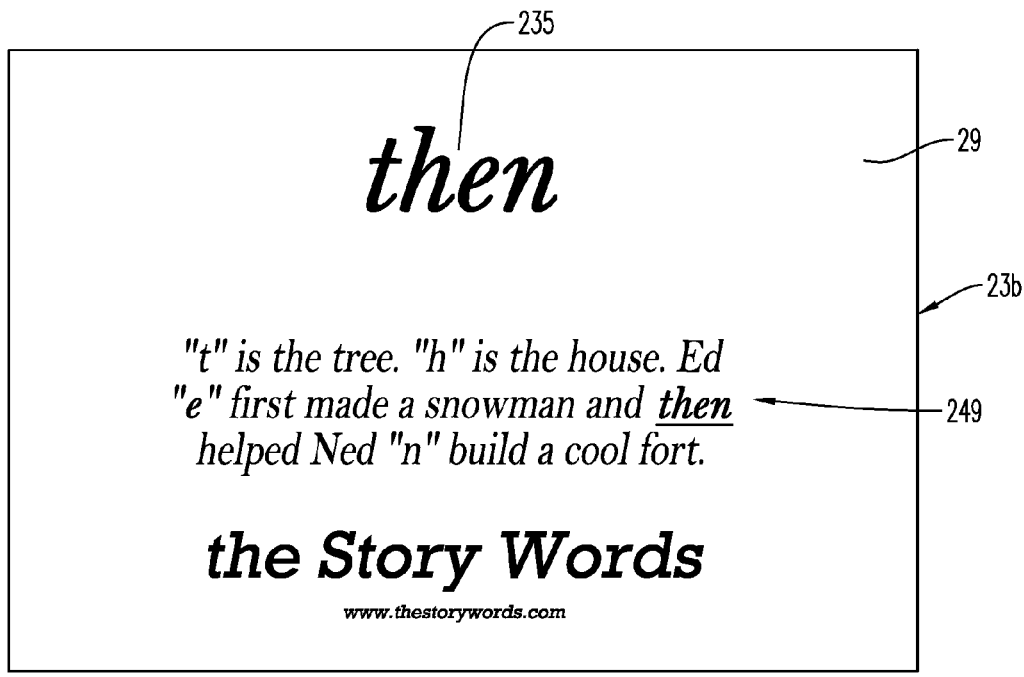
Figure 3A:
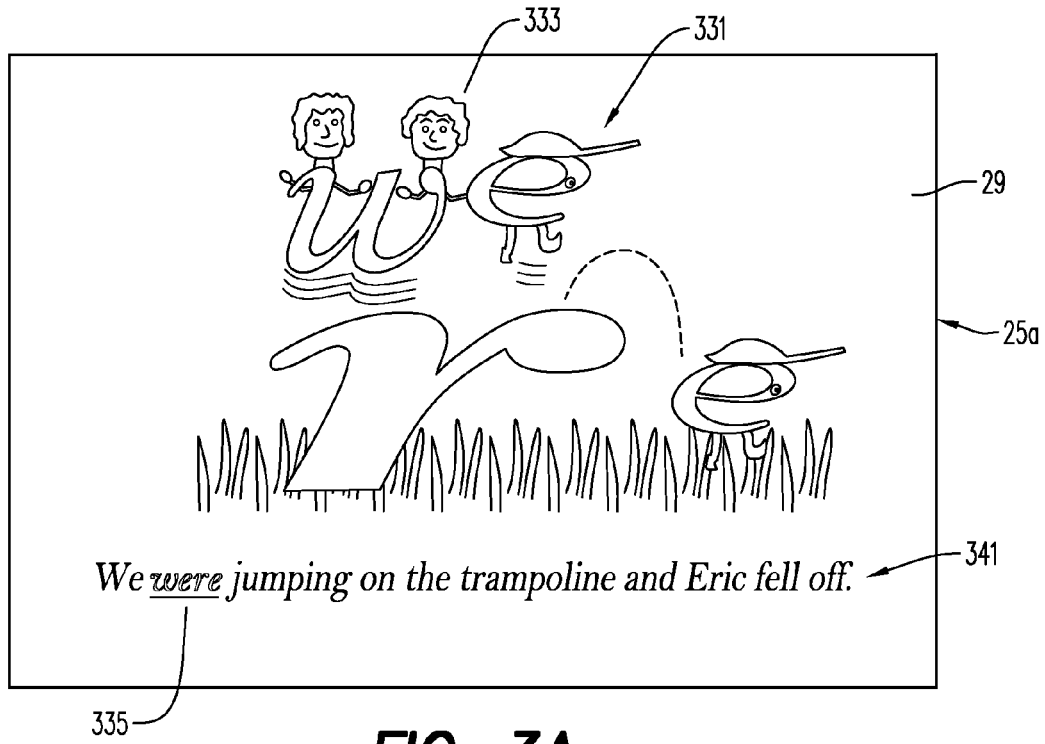
Figure 3B:
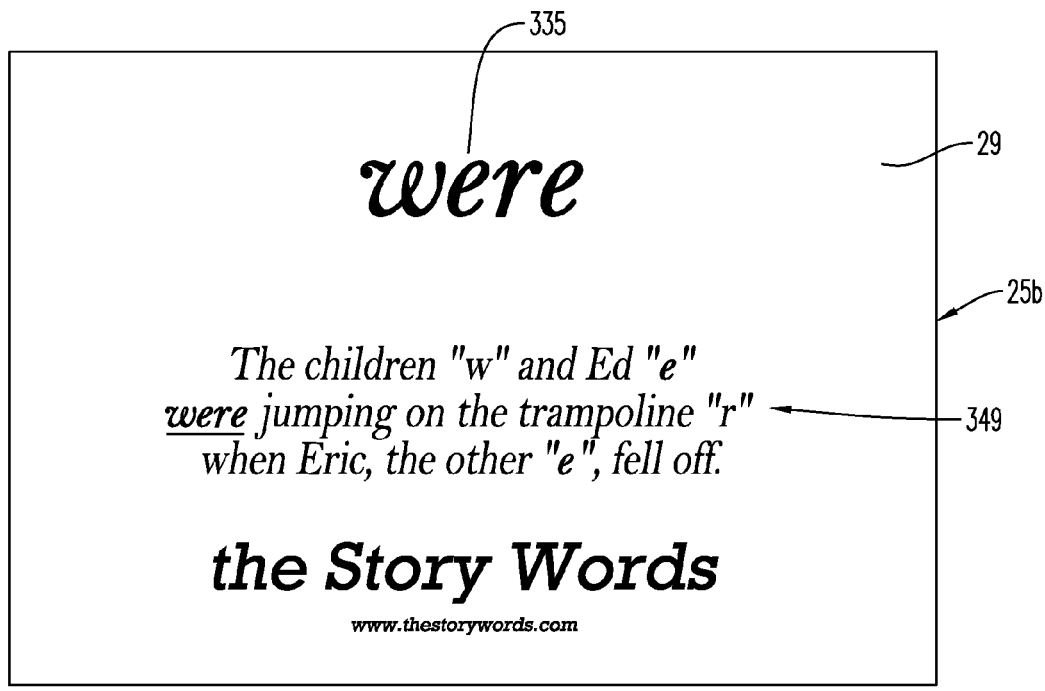

Embodiments of learning aids 21a-b, 23a-b, 25a-b, and 27a-b are seen in FIGS. 1A-4B, respectively. The learning aids include a tangible medium of expression 29, such as printed paper. The phrase tangible medium of expression 29 is intended to be broadly construed and may be any medium upon which an image can be fixed such that the image is capable of being perceived, reproduced, or otherwise communicated, either directly or with the aid of a machine or device. For example, the medium 29 may be any material upon which an image can be printed, transparency or film, and any other suitable analog recording media or digital recording media, such as magnetic or optical recording media, such as storage tapes or disks, or an internet web-site.

The learning aids also include a pictorial image 31 fixed on the medium 29. The image 31 is at least partially formed of letters 33 making up a spelling word 35. As seen in the learning aid 21a-21b of FIGS. 1A-1B, for example, the spelling word "or" 35 is formed of the letter "o" 33o that forms part of an image of an object, the lamp 37, and the letter "r" 33r that forms part of an image of another object, the table 39 upon which the lamp 37 sits.

The learning aids also include at least one sentence 41 illustrated by the image 31 and associated with the medium 29. While the sentence 41 will ordinarily be fixed on the medium 29 in the same or substantially the same manner as the image 31, the sentence 41 may be otherwise associated with the image, such as by being provided separately from the image, such as by providing the image on a card, and providing the sentence on a discrete medium such as a teacher's manual.

The sentence 41 includes at least one use of the spelling word 35. In FIG. 1A, for example, the sentence 41 uses the spelling word "or" and reads, "We can turn on the light to see what was making the strange noise or we can stay hidden under the bed." The image 31 includes the letters "o" and "r" as part of the image illustrating the sentence 41. Ordinarily, all of the letters 33 in the spelling word 35 are used in forming the image 31, however, some letters may not be part of the image and characters and objects in an image need not be referred to in the sentence 41 and need not be partially formed of letters 33 in the spelling word 35.

The sentence 41 can include at least one other word 43 beginning with at least one letter 33 of the spelling word 35. For example, in the learning aid 23a-23b of FIGS. 2A-2B, the sentence 241 reads, "First, Ed made a snowman and then he helped Ned build a cool fort." In the image 231 depicting the sentence 241, the letter "e" 233e of the word "then" is represented by the character "Ed" 43e, and the letter "n" 233n of the spelling word "then" is represented by the character "Ned" 43n. The letters of a given spelling word will ordinarily depict objects, such as, in the learning aid 21a-21b of FIGS. 1A-1B, the "o" 33o forming part of the lamp 37 and the 33r "r" forming part of the table 39, or characters, such as, in FIGS. 2A-2B, the "e" 233e forming part of the character "Ed" and the "n" 233n forming part of the character "Ned".

Some or all of the letters 33 of the spelling word 35 may depict an object or character having a name beginning with the letter. The object or character does not, however, have to be an object or character used in the sentence. For example, in the learning aid 23a-23b of FIGS. 2A-2B, the sentence 241 reads, "First, Ed made a snowman and then he helped Ned build a cool fort." In the image 231, the letter "t" in the spelling word "then" depicts a tree 45, i.e., a word beginning with the letter "t", and the letter "h" in the word "then" depicts a house 47, i.e., a word beginning with the letter "h". The sentence 241 does not refer to a tree or a house.

The learning aid can also include a text passage 49 associated with the medium 29 and explaining how the letters 33 in the image 31 are used. The text passage 49 will ordinarily be fixed on the medium 29 in the same or substantially the same manner as the image 31, however, the text passage 49 may be otherwise associated with the image, such as by being provided separately from the image, such as by providing the image on a card, and providing the sentence on a discrete medium such as a teacher's manual. Ordinarily, the text passage 49 will not be visible to one viewing the image 31. For example, when the image is on one side 21a of a learning aid in the form of, e.g., a card as in the learning aid of FIG. 1A, the text passage 49 will ordinarily be on the opposite side 21b of the card.

The text passage 49 will typically clarify or explain the use of the letters 33 in the image 31 in an order in which the letters appear in the spelling word 35. For example, in FIG. 1B, where the spelling word "or" is illustrated by a lamp 37 partially formed of the "o" and a table 39 partially formed of the "r", the text passage 49 reads "'o' is the lamp sitting on the table 'r.'" By providing this text passage 49, teachers can be assured that their interpretations of the image 31 on a medium 29 are consistent from teaching session to teaching session.

The learning aid will ordinarily comprise a plurality of images 31, 231, 331, 431, etc. corresponding to a corresponding plurality of spelling words 35, 235, 335, 435, etc., fixed on the medium 29. All of the images need not be fixed on a single element of the medium, i.e., all on a single card. The images may be fixed on the medium in the sense that they are on the same type of medium, although the particular elements of the medium are discrete. For example, the images may be fixed on a corresponding plurality of surfaces of the medium, such as by fixing different images on separate sheets of paper or cards. The spelling words depicted by the images will ordinarily be words selected from known word groups that are considered suitable for students of various ages or abilities. One such list is the so-called "Dolch List" of words identified in Dolch, Edward William, *Problems in Reading* (The Garrard Press, 1948).

The images 31, 231, 331, 431, etc. are each at least partially formed of letters 33, 233, 333, 433, etc. making up a corresponding plurality of spelling words 35, 235, 335, 435, etc. A corresponding plurality of sentences 41, 241, 341, 441, etc., illustrated by the images 31, 231, 331, 431, etc. are also associated with the medium 29 upon which the images are fixed. Each of the plurality of sentences 41, 241, 341, 441, etc. includes at least one use of a corresponding one of the plurality of spelling words 35, 235, 335, 435, etc.

Figure 4A:
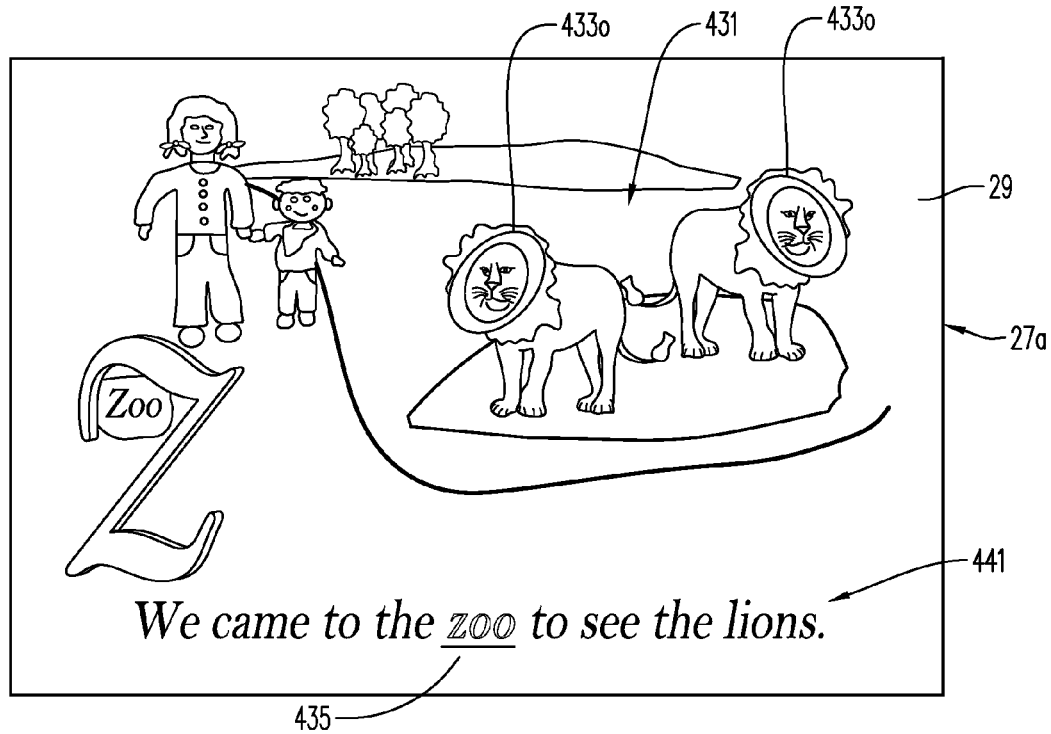
Figure 4B:
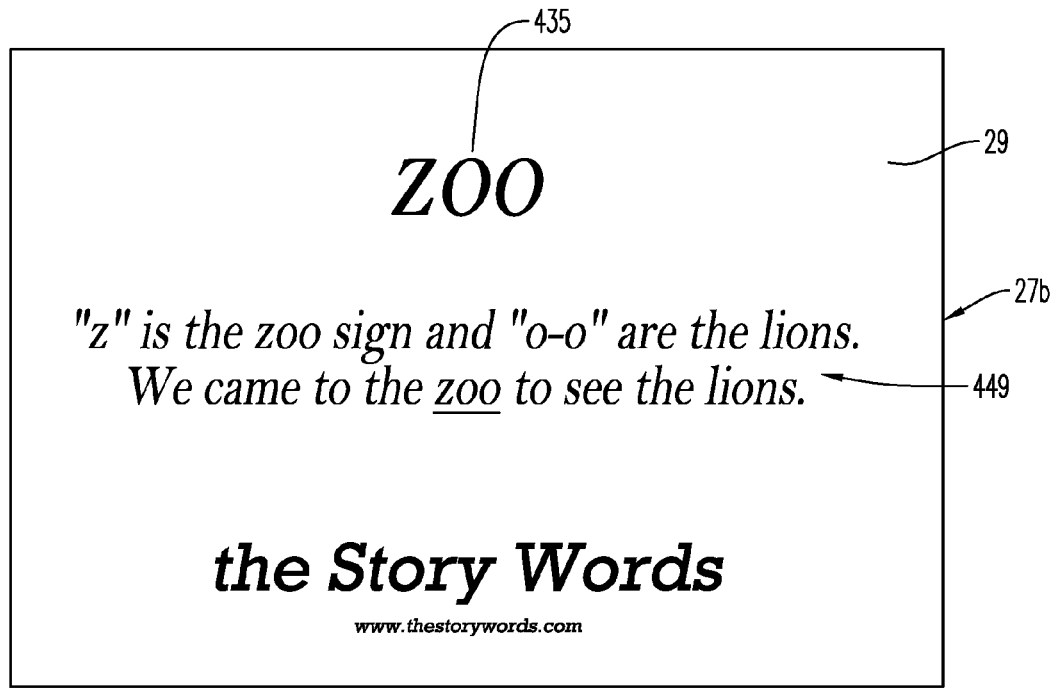

Each sentence 41, 241, 341, 441, etc. will ordinarily be complete and tell the story of the image to which it corresponds. However, some of the plurality of sentences can, together, comprise a larger story. For example, the sentences 241 and 341 can be part of a larger story involving the character "Ed". Some of the letters in a spelling word, the letters at least partially forming each of the plurality of images, depict objects or characters. Particular objects or characters depicted by particular letters can be the same in different sentences. For example, the character "Ed" can be used for a letter "e" in the spelling words "then" and "were" in sentences 241 and 341. Another example of using the same object or character for the same letter is shown in FIGS. 4A-4B, wherein two lions illustrate the letters 4330 "o" and "o" in the spelling word 435 "zoo". Of course, different characters or objects can also be used for the same letter, such as in FIGS. 3A-3B, where the first letter "e" and the second letter "e" in the spelling word 335 "were" are different characters referred to as "Ed" and "Eric".

Figure 5:
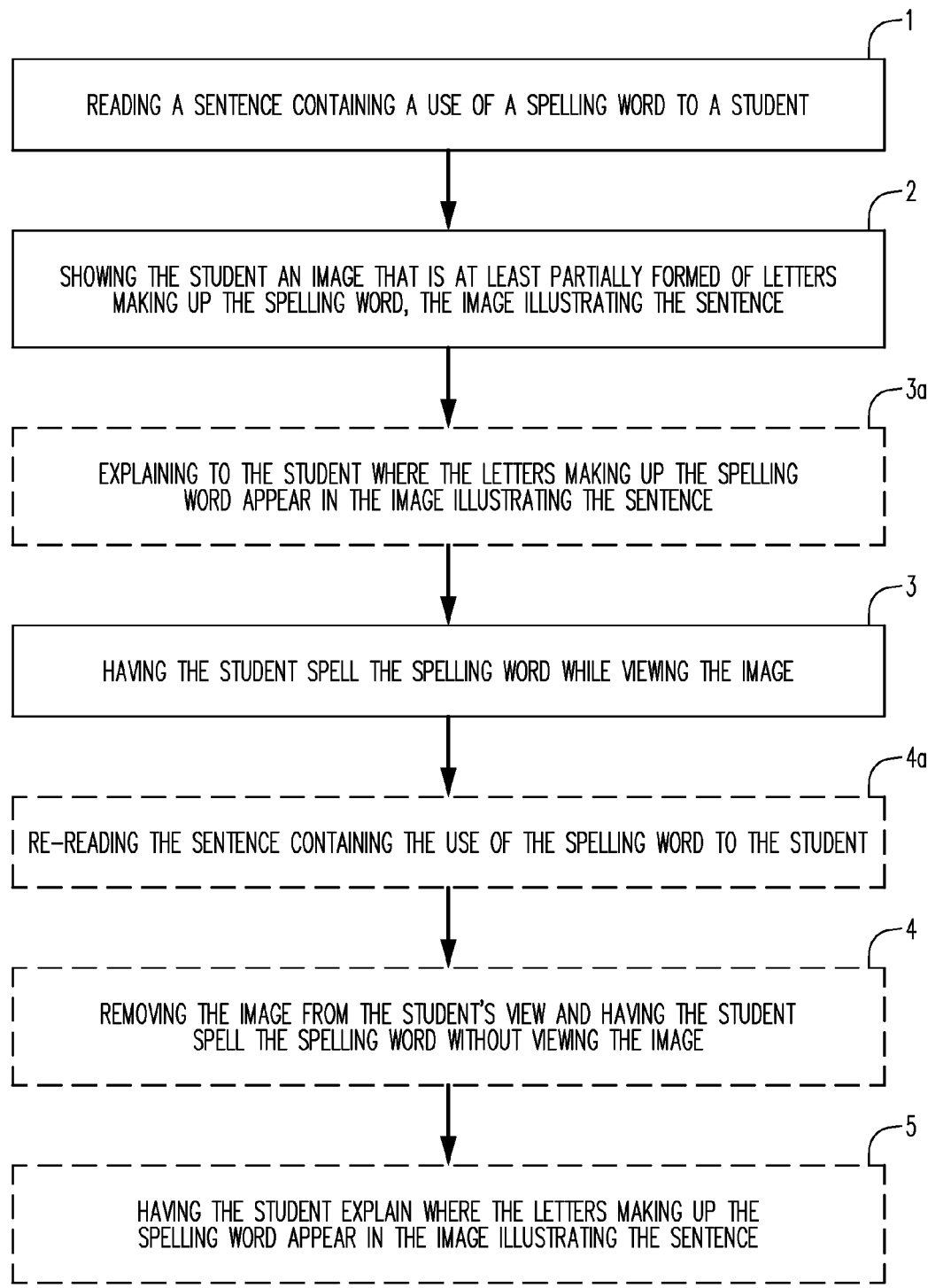
FIG. 5 is a flowchart illustrating steps in a method according to an embodiment of the present invention.

Steps of a teaching method according to the present invention are shown in FIG. 5. Steps that are ordinarily performed in connection with the method are illustrated in the flow chart as boxes formed of solid lines, while more optional steps are illustrated as boxes formed of dotted lines. Referring to the learning aid 31 shown in FIG. 1, as seen in FIG. 5, the teaching method comprises a step identified here as step 1 comprising reading a sentence 41 containing a use of a spelling word 35 to a student. Usually while reading the sentence 41, the student is shown an image 31 that is at least partially formed of letters 33 making up the spelling word 35, shown here as step 2. In addition, the image 31 illustrates the sentence 41. The student is then requested to spell the spelling word 35 while viewing the image 31 in which the letters of the spelling word are used to at least partially form the image, shown here as step 3.

In some instances, it may be helpful to explain to the student where the letters 33 making up the spelling word 35 appear in the image 31 illustrating the sentence 41 prior to having the student spell the spelling word, shown here as step 3a. After having the student spell the spelling word 35 while viewing the image 31, it may be helpful to remove the image from the student's view and have the student spell the spelling word without viewing the image, shown here as step 4. After removing the image from the student's view and prior to having the student spell the spelling word without viewing the image, it may be useful to re-read the sentence containing the use of the spelling word to the student, shown here as step 4a. A further step, shown here as step 5, can involve having the student explain where the letters 33 making up the spelling word 35 appear in the image 31 illustrating the sentence 41.

While it is presently contemplated that the invention will ordinarily be in the form of a series of cards with printed matter, it will be appreciated that the subject matter that appears on the printed cards can be projected on a screen using, e.g., transparencies or film, or viewed on a television or computer-type screen. Instead of having all text be printed text, some of the text may be in audio form. Also, the image need not be a two-dimensional printed image and may be a three-dimensional structure.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A teaching method comprising:
   reading a sentence printed on a tangible medium of expression, the sentence containing a use of a spelling word to a student;
   showing the student a pictorial image that is at least partially formed of letters making up the spelling word, the image illustrating the sentence and being printed on the tangible medium of expression; and
   having the student spell the spelling word while viewing the image.

2. The teaching method as set forth in claim 1, comprising, prior to having the student spell the spelling word, explaining to the student where the letters making up the spelling word appear in the pictorial image illustrating the sentence.

3. The teaching method as set forth in claim 1, comprising, after having the student spell the spelling word while viewing the image, removing the pictorial image from the student's view and having the student spell the spelling word without viewing the image.

4. The teaching method as set forth in claim 3, comprising, after removing the image from the student's view and prior to having the student spell the spelling word without viewing the pictorial image, re-reading the sentence containing the use of the spelling word to the student.

5. The teaching method as set forth in claim 1, comprising having the student explain where the letters making up the spelling word appear in the pictorial image illustrating the sentence.

* * * * *